United States Patent [19]
Inao

[11] Patent Number: 5,707,413
[45] Date of Patent: Jan. 13, 1998

[54] METHOD AND APPARATUS FOR BLOW AND BLOW PRODUCTION OF HOLLOW GLASS ARTICLE

[75] Inventor: Takaaki Inao, Otsu, Japan

[73] Assignee: Nippon Electric Glass Co., Ltd., Otsu, Japan

[21] Appl. No.: 507,299

[22] PCT Filed: Dec. 26, 1994

[86] PCT No.: PCT/JP94/02232

§ 371 Date: Oct. 5, 1995

§ 102(e) Date: Oct. 5, 1995

[87] PCT Pub. No.: WO95/18074

PCT Pub. Date: Jun. 7, 1995

[30] Foreign Application Priority Data

Dec. 27, 1993 [JP] Japan .................... 5-332148

[51] Int. Cl.⁶ .................................................. C03B 9/14
[52] U.S. Cl. .................. 65/78; 65/81; 65/261; 65/263; 65/300
[58] Field of Search .................... 65/66, 68, 77, 65/78, 81, 243, 261, 263, 300

[56] References Cited

U.S. PATENT DOCUMENTS

| | | | |
|---|---|---|---|
| 2,020,031 | 11/1935 | Kadow | 65/263 X |
| 2,225,948 | 12/1940 | Beatty | 65/64 |
| 2,348,347 | 5/1944 | Koob | 65/261 |
| 2,669,806 | 2/1954 | Van de Walle et al. | 65/224 |
| 3,195,996 | 7/1965 | Tingley | 65/263 X |
| 4,289,523 | 9/1981 | Murakawa et al. | 65/172 |

*Primary Examiner*—Donald E. Czaja
*Assistant Examiner*—Sean Vincent
*Attorney, Agent, or Firm*—Nikaido Marmelstein Murray & Oram LLP

[57] ABSTRACT

The method and apparatus for producing a hollow glass article permit removal of a resulting hollow glass article without severing a moil. By this, glass powder which would otherwise be caused and fallen into the hollow glass article during severing the moil may prevented. The invention also permits elimination of a means for positioning a respective blow head and for stopping rotation thereof. A quantity of molten glass of a disk-shaped configuration is supplied onto a support ring. Each blow head is lowered onto a corresponding support ring. The molten glass on the support ring is held by the blow head by its periphery. Then, the support ring is removed or withdrawn. A quantity of air is blown into the molten glass by means of the blow head so as to form a hollow glass article. Subsequently, the holding ability of the blow head is eliminated, so as to remove or unload the resulting hollow glass article. Alternatively, the support rings may be omitted.

8 Claims, 3 Drawing Sheets

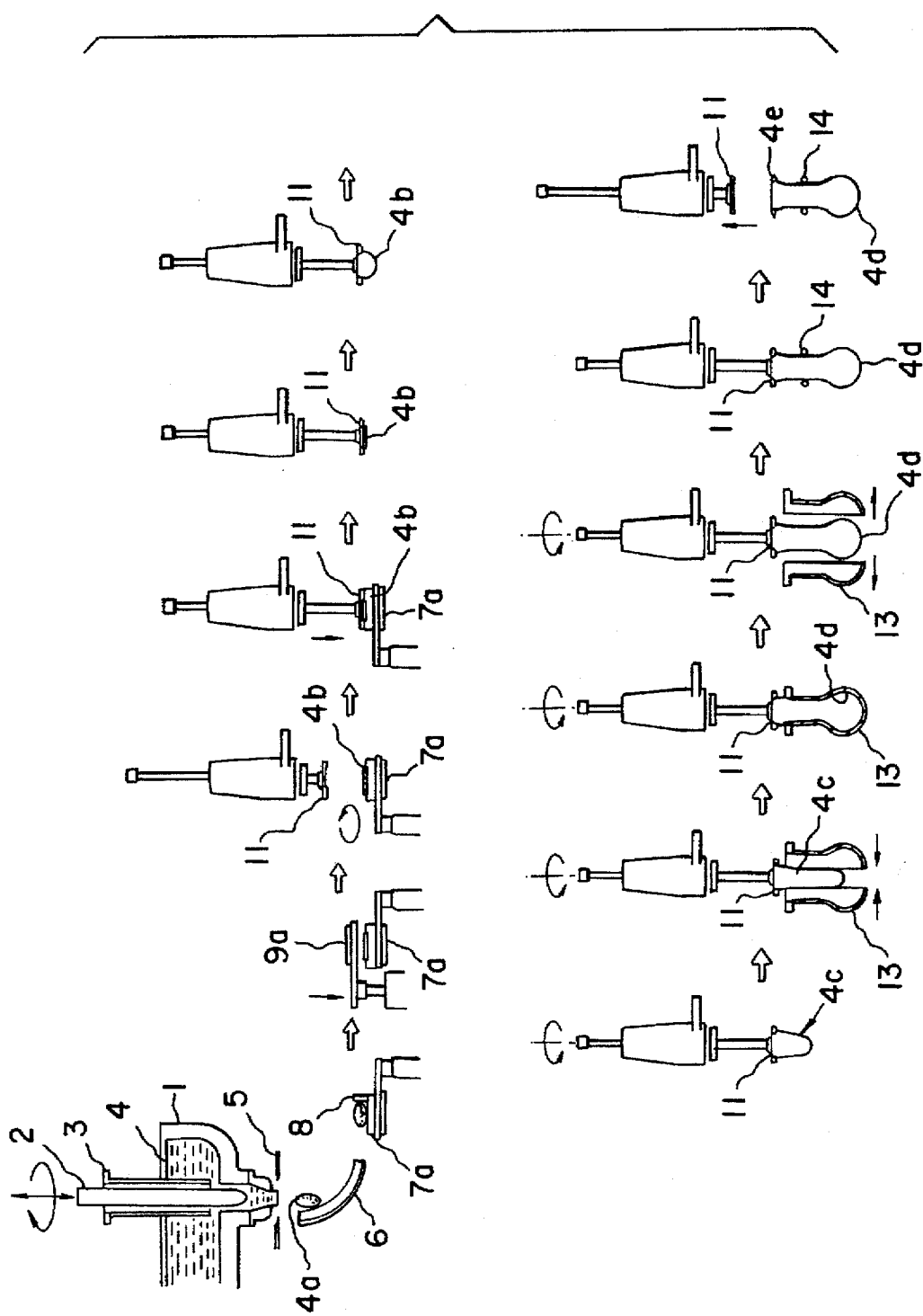

METHOD AND APPARATUS FOR BLOW AND BLOW PRODUCTION OF HOLLOW GLASS ARTICLE

BACKGROUND

1. Technical Field

The invention relates to a method and an apparatus for producing a hollow glass article, such as, a bulb for an electric lamp, a glass shell for a mercury lamp, vessels for physics and chemical purpose, e.g., beakers or flasks, tableware, e.g., tumblers or teapots, and inner glass-bins for vacuum bottles.

2. Prior Art

Conventionally, when a hollow glass article is produced using a blowing machine, a predetermined volume of molten glass, intermittently supplied from a feeder disposed adjacent to a glass melting furnace, is formed into a disk-shaped configuration. The molten glass of a disk-shaped configuration is sequentially supplied onto a plurality of support rings equidistantly disposed around a turn table of a blowing machine. Each support ring is rotated so as to cause a portion of the molten glass to hang down through a circular hole in the support ring. The molten glass is then introduced into a mold. A quantity of air is blown into the molten glass in the mold from a blow head, so as to produce a hollow glass article of a desired configuration. The thus resulting hollow glass article is connected with an annular moil on the support ring which has been stopped at a predetermined rotational position. Thus, it is necessary to sever the moil in order to remove or unload the resultant hollow glass article.

With the prior art method for producing a hollow glass article, a quantity of glass powder is produced during severing the moil. Such glass powder tends to be fallen into inside of the hollow glass article just after a blow molding operation. This needs washing or cleaning operation at a subsequent stage. In some cases, the glass powder is melt and adhered to the hollow glass article, so as to cause unacceptable article. A device for rotating a support ring of a considerable weight and for accurately positioning it at its rotational position is also required.

SUMMARY OF THE INVENTION

Under the circumstances, it is an object of the invention to provide a method and an apparatus for producing a hollow glass article which permits removal of the hollow glass article without severing a moil, which prevents occurrence of glass powder which might be otherwise caused during severing the moil, and which may obviate a particular device for positioning the blow head and for stooping it at a rotational position.

In order to achieve the above object, the first method for producing a hollow glass article comprises the steps of: supplying a quantity of molten glass of a disk-shaped configuration onto a support ring; lowering a blow head toward the support ring so as to permit the quantity of molten glass on the support ring to be held by its periphery by means of the blow head; withdrawing the support ring from the blow head when the quantity of molten glass has been held by the blow head; supplying a quantity of air into the molten glass from the blow head, so as to form a hollow glass article by means of a blow-molding operation; and eliminating the holding ability of the blow head relative to the hollow glass article so as to remove the hollow glass article from the blow head.

The second method according to the invention comprises the steps of: supplying a quantity of molten glass of a disk-shaped configuration to a position below a blow head; lowering the blow head so as to permit the quantity of molten glass to be held by its periphery by means of the blow head; supplying a quantity of air into the molten glass from the blow head, so as to form a hollow glass article by means of a blow-molding operation; and eliminating the holding ability of the blow head relative to the hollow glass article so as to remove the hollow glass article from the blow head.

A first apparatus of the invention comprises a plurality of support rings equidistantly disposed around a turn table for receiving a quantity of molten glass formed into a disk-shaped configuration, the support rings being adapted to be withdrawn by means of a withdrawing means; and a plurality of blow heads disposed around the turn table at a position above and in opposed relationship with corresponding support rings for vertical movement, each of the blow heads being adapted to hold the molten glass of a disk-shaped configuration, having been supplied onto a corresponding support ring, by its periphery through a holding means. The first apparatus of the invention is directly used in the practice of the first method of the invention.

A second apparatus comprises a plurality of blow heads disposed around a turn table for vertical movement, each of the blow head being adapted to receive a quantity of molten glass formed into a disk-shaped configuration by a lower gob molding member and to hold it by its periphery through a holding means. The second apparatus of the invention is directly used in the practice of the second method of the invention.

According to the first method of the invention, the molten glass of a disk-shaped configuration is once supplied onto the support ring. Then, the molten glass on the support ring is held by the blow head and the support ring is withdrawn or removed, so as to perform a blow molding operation. Thus, it is possible for the hollow glass article having been blow-molded to be removed or unloaded by eliminating the holding ability of the blow head, without severing or cutting the moil integral with the hollow glass article.

According to the second method of the invention, the support ring used in the first method is obviated. The molten glass of a disk-shaped configuration is directly supplied to a position below the blow head, and held by the blow head, so as to perform a blow molding operation. Thus, it is also possible for the hollow glass article having been blow-molded to be removed or unloaded by eliminating the holding ability of the blow head, without severing or cutting the moil integral with the hollow glass article.

In accordance with the first apparatus of the invention, the support ring may be removed or withdrawn by means of the withdrawing means during blow molding operation. Furthermore, the blow head is provided with a means for holding the molten glass of a disk-shaped configuration by its periphery. Thus, it is unnecessary for the moil to be severed or cut during removal of the hollow glass article. Accordingly, the first apparatus facilitates practice of the first method of the invention.

In accordance with the second apparatus of the invention, the molten glass of a disk-shaped configuration may be directly transferred onto the blow head from the lower gob molding member and held thereon. This contributes simplification of the apparatus. Furthermore, it is unnecessary for the moil to be severed or cut during removal of the hollow glass article. Accordingly, the second apparatus facilitates practice of the second method of the invention.

According to the invention of Claim 1, the hollow glass article having been blow-molded may be removed or unloaded without cutting or severing the moil. Thus, generation of glass powder which otherwise tends to be directed into inside of the hollow glass article may be entirely prevented.

According to the invention of Claim 2, the advantage similar to that of the invention of Claim 1 may be obtained, notwithstanding the fact that the support ring is obviated.

According to the invention of Claim 3, the invention of Claim 1 may be easily carried out.

According to the invention of Claim 4, the invention of Claim 2 may be easily carried out, with the blowing machine being entirely simplified.

BRIEF DESCRIPTION OF THE DRAWINGS

FIG. 2 is an illustrative view showing a sequential process of a second method according to the invention.

BEST MODE FOR CARRYING OUT THE INVENTION

Figure 1:
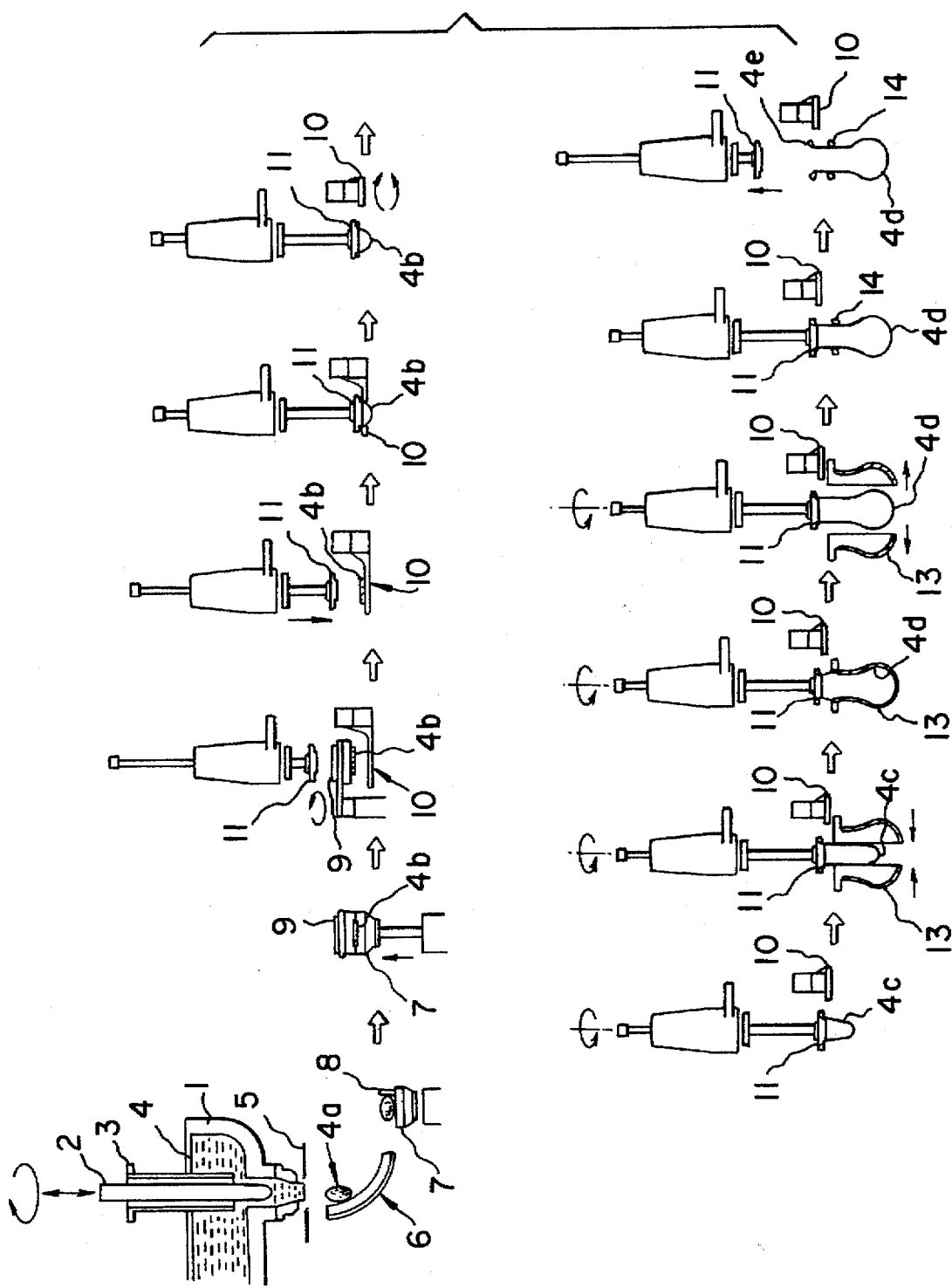
FIG. 1 is an illustrative view showing a sequential process of a first method according to the invention.

With reference to FIG. 1 showing a sequential process of a first method according to the invention, reference numeral 1 designates a feeder disposed adjacent to a glass melting furnace, 2 and 3 a vertically movable plunger and a rotatable tube disposed at an outlet port of the feeder 1 for controlling a quantity of molten glass 4 to be supplied. Reference numeral 5 designates a cutting blade for cutting a quantity of molten glass 4 supplied from the feeder 1 into a lump of molten glass (referred to as a "gob 4a" hereinbelow) of a predetermined volume, 6 a gob chute, 7 a lower gob molding member, 8 a gob stopper, and 9 an upper gob molding member. The gob 4a supplied into the lower gob molding member 7 is urged against the upper gob molding member 9 by reason of the upward movement of the lower mold 7, and molded into a disk-shaped molten glass (referred to as a "paddy 4b", hereinbelow). The upper gob molding member 9, in accordance with a first method of the invention, is capable of holding the paddy 4b, having been molded into a disk-shaped configuration, by means of a holding means, for example, of a vacuum adhesion type. Thus, the lower gob molding member 7 may be returned to the original, lowered position in preparation for a supply of the next gob 4a. The upper gob molding member 9 is then rotated for cancellation, of a vacuum force applied to the paddy, so as to transfer or supply the paddy 4b onto a support ring 10. Then, the upper gob molding member 9 is rotated and returned to the original position above the lower gob molding member 7 in preparation for molding the next paddy.

In practice, a plural pairs of vertically oppositely opposed support ring 10 and blow head 11 are disposed equidistantly around a turn table 12 of a blowing machine (see FIG. 3). When the paddy 4b is supplied onto the support ring 10, the blow head 11 is lowered so as to hold the paddy 4b by its periphery on the support ring 10 by means of a vacuum adhesion force, for example. Then, the support ring 10 is displaced from the position below the blow head 11, by means of a withdrawing means for opening, pivoting downwadly, or moving rearwardly the support ring 10. In this regard, it is noted that, when the support ring 10 is moved or withdrawn rearwardly, the blow head 11 is once moved upwardly or raised, and then the support ring 10 is withdrawn, with the paddy 4b being held in a raised position. Thereafter, the blow head 11 is returned to the lowered position.

When the support ring 10 has been removed or withdrawn, the blow head 11 is rotated so as to cause the paddy 4b to hang down due to its weight. If desired, the paddy 4b may be formed into an intermediate article called a "parison 4c" by blowing a quantity of air into the paddy 4b from the blow head 11 by which the paddy 4b is held. Subsequently, a pair of mold halves 13, 13 are closed. Then, a blow molding operation is performed by supplying a quantity of air into the paddy 4b or parison 4c, so as to form it into a hollow glass article 4d. When the blow molding operation has been completed, the mold halves 13, 13 are opened and the rotation of the blow head 11 is stopped. Then, the resulting hollow glass article 4d is released from the blow head. Thus, the hollow glass article 4d integral with a moil 4e may be removed by means of a chuck pawl 14 or chute for removing the hollow glass article 4d. Then, the blow head 11 is returned to the raised position, while the support ring 10 is returned to its original position in preparation for the next supply of a paddy 4b. The above procedures will be repeatedly performed in order to continuously produce hollow glass articles.

FIG. 2 is an illustrative view showing a sequential process of a second method according to the invention. It is to be noted that, in FIG. 2, like components similar to those in FIG. 1 are designated by like reference numerals and thus explanation therefor will be omitted in the following description. In accordance with the second method of the invention, the lower gob molding member 7a receives a gob 4a from the gob chute 6. The gob 4a is formed into a paddy 4b by reason of the downward movement of the upper gob molding member 9a. The lower gob molding member 7a is pivoted so as to place the paddy 4b at a position below the blow head 11. Then, the blow head 11 is lowered so as to hold thereon the paddy 4b, without using the support ring 10, in a manner similar to that in the aforementioned first method. In this case, the blow head 11 is once raised to an upper position when the paddy 4b on the lower gob molding member 7a has been held by the blow head, and then returned again to the lowered position when the lower gob molding member 7a has been pivoted to its original position. In this connection, it is to be noted that the lower gob molding member 7a, rather than the blow head 11, may be moved in the vertical direction. When the lower gob molding member 7a has been pivoted to its original position, the blow head 11 is rotated so as to cause the paddy 4b to hang down due to its weight. If desired, the paddy 4b may be formed into a "parison 4c" by blowing a quantity of air into the paddy 4b from the blow head 11 by which the paddy 4b is held. Subsequently, the pair of mold halves 13, 13 are closed. Then, a blow molding operation is performed by supplying a quantity of air into the paddy 4b or parison 4c, so as to form it into a hollow glass article 4d. When the blow molding operation has been completed, the mold halves 13, 13 are opened and the rotation of the blow head 11 is stopped. Then, the resulting hollow glass article 4d is released from the blow head. Thus, the hollow glass article 4d integral with a moil 4e may be removed by means of a chuck pawl 14 or chute for removing the hollow glass article 4d. Then, the blow head 11 is returned to the raised position in preparation for the next supply of a paddy 4b. The above procedures will be repeatedly performed in order to continuously produce hollow glass articles.

The vacuum adhesion mechanism mentioned above may be constructed as shown in FIG. 3(A). Specifically, the disk-shaped blow head 11 includes an outlet port 11a for air-blowing centrally located in its lower surface. The blow head 11 is also provided with an annular recess 11b extending in the periphery of the lower surface thereof. The annular recess 11b has, in its bottom surface, a plurality of suction ports 11c. Vacuum force is applied to the peripheral portion of the paddy 4b through the suction ports 11c, so that the paddy 4b is held by the blow head 11 by means of the vacuum adhesion force. The blow head 11 is slidably secured to a slide shaft 11d at its lower end. The slide shaft 11d includes, at its upper portion, a slidable piston (not shown). The slidable piston is received within each cylindrical body 11e for slidable movement in the vertical direction. The cylindrical bodies 11e are equidistantly disposed around the turn table 12 of the blowing machine. The turn table 12 is rotatably and continuously driven by a drive means (not shown) of the blowing machine at a predetermined speed. The slide shaft 11d is disposed within a rotatable sleeve 11f for slidable movement in the vertical direction. The slide shaft 11d is also adapted to be rotated in unison with the rotatable sleeve 11f. The rotatable sleeve 11f is supported within the cylindrical body 11e through a bearing 11g so as to be rotatable but not displaceable in the vertical direction within the cylindrical body 11e. A chainwheel 11h is secured to the rotatable sleeve 11f at its lower end. Rotational movement of the rotatable sleeve 11f may be transmitted through the chainwheel 11h to the blow head 11 during blowing operation. This causes a wall thickness of a hollow glass article to be formed to become uniform in its entirety. A blow pipe 11j extends through the central portion of the slide shaft 11d. The blow pipe 11j is in communication with a blow-air supply through a rotary joint 11k disposed at the upper end of the blow pipe 11j. An annular vacuum passage 11m is defined as between the outer periphery of the blow pipe 11j and the inner periphery of the slide shaft 11d. The vacuum passage 11m is in communication, at its lower end, with the suction ports 11c disposed circumferentially in the lower surface of the blow head 11. The upper end of the vacuum passage 11m is in communication with a vacuum source through a rotary joint 11n which is disposed at a position slightly below the upper end of the slide shaft 11d. Due to the above construction, the blow head 11 is capable of holding thereon the paddy 4b by its periphery by means of a vacuum adhesion force. The blow head 11 is also capable of shutting down the vacuum force while applying atmospheric pressure or compressed air, so as to release therefrom the hollow glass article 4d, when the hollow glass article 4d has been formed. In this connection, it is to be noted that such change-over operation between vacuum pressure and the atmospheric pressure (or compressed air) may be performed using a change-over valve, for example.

When a mechanical chuck is used in order to hold the hollow glass article, a plurality of holding pawls of an arcuate configuration are provided around the blow head 11. The holding pawls are directed, at their one ends, toward the center of the blow head so that they are opened or closed relative to one another. When the holding pawls are closed, they scoop the periphery of the paddy 4b in the upward direction, so as to hold it at its substantially entire circumference between the lower surface of the blow head 11 and the upper surface of the holding pawls.

As mentioned above, the blow head 11 to be used in the first and second method according to the invention is provided with a means for holding the disk-shaped paddy 4b by its periphery. Such holding means may be of the vacuum adhesion mechanism, mechanical chuck type or combination thereof.

Figures 3A, 3B:
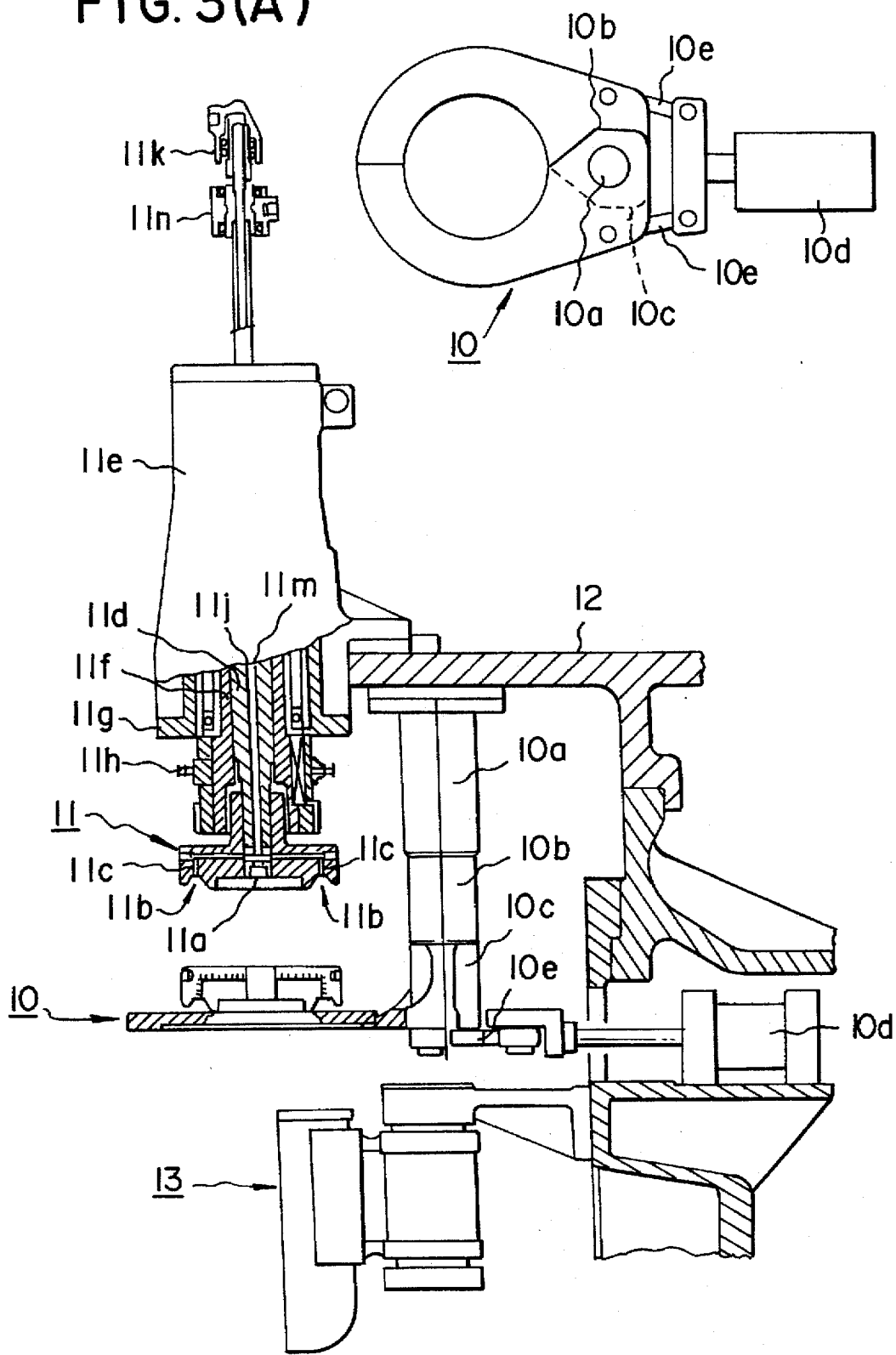
FIG. 3(A) is a side elevational view, in section, of a main part of one example of a blow head to be used in the method according to the invention.
FIG. 3(B) is a plan view of one example of a support ring to be used in the first method according to invention.

A construction of the means for withdrawing the support ring 10 to be used in the first method according to the invention will be explained in detail below. With reference to FIG. 3(A) and FIG. 3(B), the support ring 10 is disposed in opposed relationship with the blow head 11. The support ring 10 is attached to the turn table 12 of the blowing machine for open-close movement. The turn table 12 is provided with a pivot shaft 10a depending therefrom for permitting open-close movement of the support ring 10. The support ring 10 divided into two halves of a substantially semi-circular configuration. Each of the two halves forming the support ring 10 is, at its base portion 10b or 10c, pivotably connected to the pivot shaft 10a for permitting open-close movement of the support ring 10. Thus, the support ring 10 may be opened and closed by an air cylinder 10d mounted on the turn table 12 through connection links 10e, 10e at the above-mentioned appropriate timing. In FIG. 3(A), one of the molds 13 is shown to be disposed below the support ring 10.

The support ring 10 may be formed as an integral member of an annular configuration, rather than the above mentioned two halves. In such a case, the support ring 10 may be configured to be pivoted downwardly or to be moved horizontally toward the center of the turn table 12, for the purpose of withdrawal movement thereof. When the support ring 10 is configured to be moved horizontally toward the center of the turn table 12, it may be directly moved in the horizontal direction toward the right in FIG. 3(A), for example, by an air cylinder.

The invention is constructed as mentioned above. Now, general operation according to the invention will be briefly explained below. The blowing machine is provided, around the turn table 12, with a section for supplying a paddy, a section for performing blow molding, and a section for removing or unloading a resulting article or product. Hollow glass articles are continuously produced through the above sections. In accordance with the first method of the invention, the support ring 10 is only used in the section for supplying a paddy. The support ring 10 is withdrawn or removed in the section for blow molding and the section for unloading a resulting article. Thus, the article or product may be taken-out or removed without cutting the moil 4e. The moil 4e will be cut or severed in subsequent stage by means of an apparatus separate from the blowing machine. At that stage, the moil 4e may be easily severed without restricting from the various mechanisms of the blowing machine. Thus, occurrence of glass dust or glass powder may be easily prevented. In accordance with the second method of the invention, the support ring 10 is no used at all. Thus, it is possible for the product to be removed or unloaded without severing the moil 4e. In such a case, the blowing machine may be further simplified in its entire construction.

I claim:

1. A method of producing a hollow glass article in a blow-and-blow process, comprising the steps of:

supplying a quantity of molten glass of a disk-shaped configuration onto a support ring;

lowering a blow head toward the support ring so as to permit the quantity of molten glass on the support ring to be held by its periphery by means of the blow head;

withdrawing the support ring from the blow head when the quantity of molten glass has been held by the blow head;

forming a parison from the quantity of molten glass;

blow-molding the parison by supplying a quantity of air into the parison from the blow head while the parison is located in a blow mold, so as to form a hollow glass article; and eliminating the holding ability of the blow head relative to the hollow glass article so as to remove the hollow glass article from the blow head.

2. A method of producing a hollow glass article in a blow-and-blow process, comprising the steps of:

supplying a quantity of molten glass of a disk-shaped configuration to a position below a blow head;

lowering the blow head so as to permit the quantity of molten glass to be held by its periphery by means of the blow head;

forming a parison from the quantity of molten glass;

blow-molding the parison by supplying a quantity of air into the parison from the blow head while the parison is located in a blow mold, so as to form a hollow glass article; and eliminating the holding ability of the blow head relative to the hollow glass article so as to remove the hollow glass article from the blow head.

3. An apparatus for producing a hollow glass article in a blow-and-blow process, wherein a quantity of molten glass formed into a disk-shaped configuration is formed into a parison, and the parison is blow-molded by supplying a quantity of air into the parison while the parison is located in a blow mold, so as to form the hollow glass article, the apparatus comprising:

a plurality of support rings equidistantly disposed around a turn table for receiving the quantity of molten glass, and a plurality of blow heads disposed around the turn table at a position above and in opposed vertical relationship with corresponding support rings, wherein each of the blow heads comprises holding means for holding the quantity of molten glass by its periphery and blowing means for blowing the hollow glass article from the held quantity of molten glass, wherein the support rings are adapted to be withdrawn by withdrawing means when the quantity of molten glass has been held by the holding means.

4. An apparatus for producing a hollow glass article in a blow-and-blow process, wherein a quantity of molten glass formed into a disk-shaped configuration is formed into a parison, and the parison is blow-molded by supplying a quantity of air into the parison while the parison is located in a blow mold, so as to form the hollow glass article, the apparatus comprising a plurality of blow heads vertically disposed around a turn table, wherein each of the blow heads is adapted to receive the quantity of molten glass and each of the blow heads comprises holding means for holding the quantity of molten glass by its periphery and blowing means for blowing the hollow glass article from the held quantity of molten glass.

5. The apparatus of claim 3, wherein the holding means is a vacuum adhesion mechanism.

6. The apparatus of claim 4, wherein the holding means is a vacuum adhesion mechanism.

7. The method of claim 1, wherein the blow head comprises a vacuum adhesion mechanism, and wherein the quantity of molten glass on the support ring is held by its periphery by the vacuum adhesion mechanism.

8. The method of claim 2, wherein the blow head comprises a vacuum adhesion mechanism, and wherein the quantity of molten glass on the support ring is held by its periphery by the vacuum adhesion mechanism.

* * * * *